April 8, 1958 T. J. FRANZ, JR 2,830,259

POWER TRANSMISSION

Filed Dec. 13, 1954 2 Sheets-Sheet 1

INVENTOR.
THOMAS J. FRANZ, JR.
BY
Clement J. Paznokas
ATTORNEY

April 8, 1958 T. J. FRANZ, JR 2,830,259

POWER TRANSMISSION

Filed Dec. 13, 1954 2 Sheets-Sheet 2

INVENTOR.
THOMAS J. FRANZ, JR.
BY Clement J. Paznokas
ATTORNEY 2,830,259

POWER TRANSMISSION

Thomas J. Franz, Jr., University City, Mo., assignor to Vickers, Incorporated, Detroit, Mich., a corporation of Michigan Application December 13, 1954, Serial No. 474,708

14 Claims. (Cl. 323—89)

Figure 1:
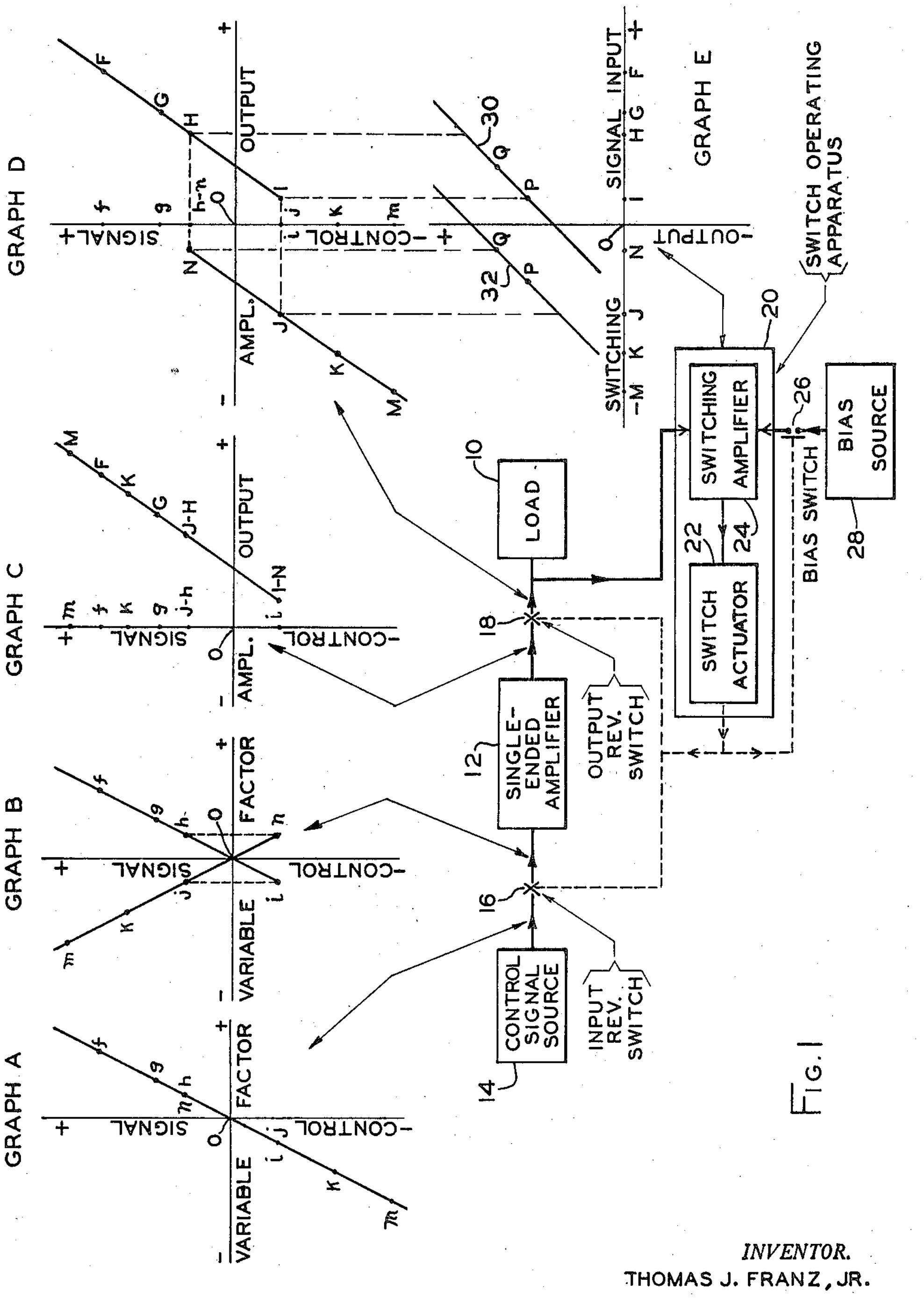

This invention relates to power transmission and more particularly to an electrical power system which provides a reversible (in polarity) output in response to a reversible input signal.

Push-pull amplifiers have been widely used to obtain a reversible output power supply in response to reversible input or control signals. Such amplifiers are made up of two symmetrical single-ended amplifiers which are oppositely affected by a signal of given polarity. A single-ended amplifier is one with a single polarity output, i. e., one whose output polarity will not reverse when the input signal polarity reverses.

When relatively large power outputs are sought, push-pull systems become expensive and bulky due to the fact that both single-ended amplifiers in the system must be of the same size and power requirement. This becomes especially serious when saturable reactor components are involved, such as in magnetic amplifiers. In order to economize in space, materials and cost, reversible output systems have been evolved utilizing only one main single-ended amplifier whose input and output are simultaneously reversed by a switch energized by the control signal to give reversibility in response to a reversible control signal. These systems are subject to a number of disadvantages, such as unwanted switching in case of failure or malfunctioning of the main amplifier and associated circuitry between the switches, involvement in complex circuitry when subjected to the control of more than one signal, accumulation of inaccuracies of errors in the system, and in some cases insufficient switching power.

The present invention substantially avoids the aforesaid disadvantages by reversing the input and output of a single-ended amplifier with a switch energized, not by the control signal, but in response to the amplifier output.

In accordance with one embodiment of the present invention the input and output of a single-ended amplifier are reversed in response to the amplifier output by a switching apparatus whose pickup and drop-out requirements are reversed in polarity in response to the output. More specifically, in one embodiment to effect the polarity reversal of the pickup and drop-out points the control characteristic of the switching apparatus containing the pickup and drop-out points is shifted by changing the bias in response to the reversal of the main amplifier output.

It is therefore an object of the present invention to provide a novel electrical power system having a reversible output in response to a reversible input signal.

Another object of the invention is to provide a novel electric power system employing a single-ended amplifier with switching means responsive to the amplifier outpuput for reversing the input and output of the amplifier.

Further objects and advantages of the present invention will be apparent from the following description, reference being had to the accompanying drawings wherein a preferred form of the present invention is clearly shown.

In the drawings:

Fig. 1 includes graphs and a block diagram illustrating a preferred embodiment of the invention. The graphs show idealized characteristic curves at various points of the system, the related graphs and points of the system being connected by double-ended arrows.

Figure 2:
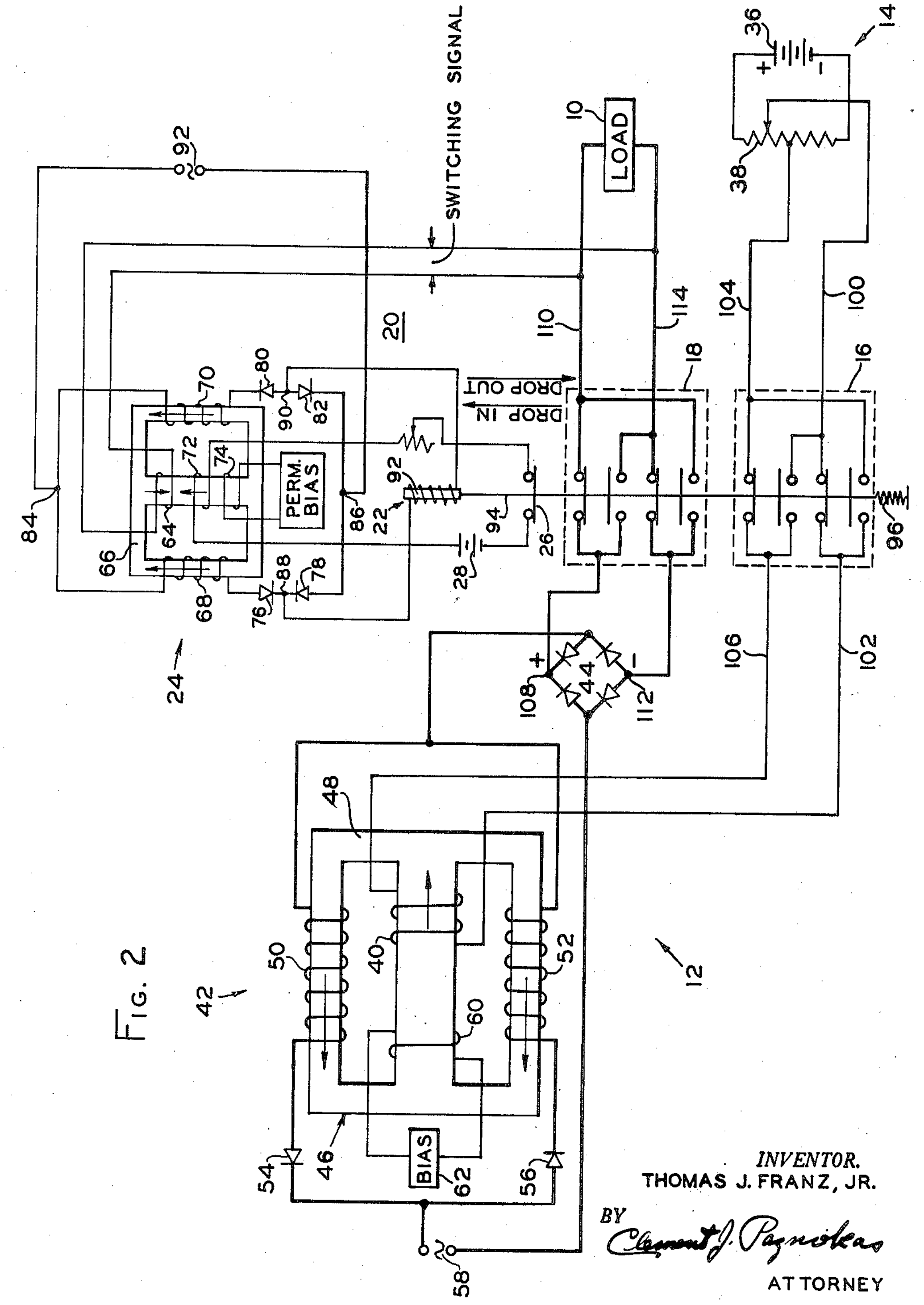

Fig. 2 is a wiring diagram showing specific components of a preferred embodiment of the invention related to the block diagram of Fig. 1.

In the electrical system shown in Fig. 1, which may be as an example, a part of a servo system, reversible direct current motor supply or other apparatus, load 10 is supplied with reversible electricity by a single-ended amplifier 12 in response to reversible signals supplied to the amplifier by a source 14 of reversible control signals such as a push-pull amplifier, manually reversible signal source, or other.

Graph A in Fig. 1 is an example of a curve of an electric control signal generated or furnished by the source 14 as a function of some variable factor such as position or other, the latter being plotted along the horizontal axis while the generated control signal values are along the vertical axis.

The amplifier 12 may be any single-ended electric amplifier having a control characteristic whose range from minimum to maximum output extends through a range of input values of both polarities, i. e., a control characteristic which crosses the zero line of the input. The control characteristic of an amplifier is a plot of the output for various values of control thus showing the output as a function of the input. Graph C is an example of the control characteristic of a single-ended amplifier, which characteristic, rising from a minimum output value to maximum output value, crosses the zero line of the signal input to the amplifier. Although it is realized that in actual practice, many amplifiers are not linear, especially near the opposite extremes of their output ranges, the curve shown in graph C is linear for idealism and simplicity, and is meant to be representative of any single-ended electric amplifier, whether it be a vacuum tube amplifier, magnetic amplifier, rotary amplifier, or any other, whose characteristic crosses the zero line of the input control signal.

In order that a single-ended amplifier be able to reverse its output in response to a reversible input signal, both the input control signal and the electrical output of the amplifier must be reversed substantially simultaneously at appropriate times. For this purpose, there is interposed between the signal source 14 and the amplifier 12 a reversing switch 16, hereinafter referred to as the input reversing switch, and between the load 10 and the amplifier 12 a reversing switch 18, hereinafter referred to as the output reversing switch. Each reversing switch has two attitudes. In one attitude a reversing switch has a first polarity relationship between the interconnected circuits, and in the second attitude of the switch this relationship is reversed. The switches 16 and 18 are operated by the operational points (pickup and drop-out) of a switch operating apparatus 20 in response to the amplifier output at the load side of the reversing switch 18.

The pickup point or value of any switch operating apparatus, regardless of its type, is the minimum current, voltage, power, or other factor, at which its energized function will be completed. The drop-out point or value is the maximum current, voltage, power, or other factor, at which it will recede from its energized position.

In the particular embodiment illustrated, the switch operating apparatus 20 includes an actuator 22, for example a solenoid, and an amplifier 24 interposed between the load side of the switch 18 and the actuator 22, and hereinafter referred to as the switching amplifier. Although the biasing arrangements hereinafter described may be related to the switching amplifier 24, the invention could be practiced without the switching amplifier by relating the biasing arrangements directly to actuator 22, since solenoids and other types of electrically operated actuators can be biased. Since the switch operating apparatus 20 may or may not include an amplifier as the case may be, the broad explanation shall refer to the switching apparatus 20 as a whole.

Thus, graph E may represent curves showing differently biased positions of an example of a control characteristic for the switching apparatus 20 as a whole, or if a switching amplifier is interposed between the load side of switch 18 and the actuator 22, the curves may represent differently biased positions of an example of the control characteristic curve of the switching amplifier with pickup and drop-out values of the actuator also indicated thereon. The output values of the apparatus 20 are plotted along the vertical axis, while the input values (switching signal) are plotted along the horizontal axis.

Since the electrical output at the load side of the switch 18 does not reverse in and of itself, and since the switching signal is derived from this output, what may be termed "polarity sensitivity" must be provided to the switch operating apparatus 20 in response to a characteristic of the electrical output at the load side of the reversing switch 18. In particular, the apparatus 20 is made to operate the reversing switches 16 and 18 in response to a decreasing of the electrical output of either polarity at the load side of switch 18 to some particular value, at which value the apparatus 20 either picks up or drops out, either operational point being operable to actuate the reversing switches 16 and 18, in order to selectively provide the alternative polarities. Whether the apparatus 20 picks up or drops out is dependent upon the bias state of the apparatus, and upon the polarity of the switching signal fed to it from the load side of switch 18. The polarity of the switching signal, which is derived from the output of amplifier 12 through the switch 18, is dependent upon the attitude of switch 18.

The apparatus 20 thus has two modes with respectively different bias states. In one mode of the apparatus 20, the bias state is such that the operational points (pickup and drop-out points) of the apparatus 20 are responsive to switching signals of one polarity, while in a second mode of the apparatus 20 the bias state is such that the pickup and drop-out points are responsive to switching signals of the opposite polarity. For example, in graph E curve 30 illustrates one mode, wherein the operational points, pickup point Q and drop-out point P, are shown as responsive to positive switching signal values, while curve 32 illustrates the second alternative mode wherein the operational points P and Q are shown as responsive to negative switching signal values. Curve 30 is the position of the control characteristic of the apparatus 20 at one bias state, while curve 32 indicates the position of the characteristic as fixed by the second bias state. A shift from curve 30 to curve 32 requires a positive bias change. This may be accomplished either by adding positive bias or by removing or reducing negative bias as long as the net effect is a positive change in the bias. Conversely, to accomplish a shift of the characteristic from the position of curve 32 to that of curve 30 requires a negative bias change. This may be accomplished either by adding negative bias or by reducing or removing positive bias, as long as the net effect is a bias change in the negative direction.

The two bias states of the apparatus 20 are selectively chosen by a bias switch 26, which in one attitude switches bias into the apparatus 20 from a bias source 28, and in a second attitude changes the bias by switching it out. This bias shall be referred to hereinafter as switch-in bias. The bias switch 26 is operated by the switch operating apparatus 20 simultaneously with the reversing switches 16 and 18. Thus each of the switches 16, 18 and 26 assumes one attitude in response to the pickup of apparatus 20 and its second attitude in response to the drop-out of apparatus 20. The particular arrangement shall be such that when the switch-in bias is added into the circuit the absolute sign of its polarity is opposite to that of the switching signal simultaneously supplied to apparatus 20 from the load side of switch 18. The relations should also be such that operation by a switching signal of one polarity always effects a bias change of the same polarity.

Much of the operation of the system of Fig. 1 can be understood from the graphs, each of which depicts the characteristic at a related point or area in the system. As hereinbefore stated graph A shows the control signal supplied by the control signal source 14. Graph B shows the control signal characteristic as "seen" by amplifier 12, i. e., after the signal has passed through the reversing switch 16. Graph C shows the output of amplifier 12 plotted as a function of the control signal supplied to the amplifier and before the output passes through the reversing switch 18. Graph D shows the output of amplifier 12 after it passes through the reversing switch 18 plotted as a function of the control signal before the control signal passes through the reversing switch 16. It will be noted that the graphs A, B, C and D are oriented so that the control signal is plotted along the vertical axis of each graph. Graph E as before stated shows two alternative positions or modes of the control characteristic of the switch operating apparatus as determined by two alternative bias states.

The input or switching signal of the apparatus 20 is derived from the output of the amplifier 12 as it appears after passing through the reversing switch 18. Thus the input in graph E and the output in graph D are shown on the horizontal axes of the respective graphs for better analytical perspective.

In operation suppose that at a particular time the control signal is at some positive value $f$. The attitudes of the switches 16 and 18 are such that the signal value $f$ produces the output value F and the switching signal F on graphs C, D and E. At this time the attitude of bias switch 26 will fix the bias state wherein the operational points of the switching apparatus will be responsive to positive switching signal values. This bias state is illustrated by curve 30 in graph E in which curve the operational points P and Q are responsive to positive switching signal values. Switch signal value F being above the value at which pickup point Q responds, the switching apparatus 20 will be "picked up" (actuator operatively energized).

As the control signal decreases in positive value from $f$ it passes through values $g$ and $h$ providing corresponding output and switching signal values G and H. Continuing through zero the control signal reverses and approaches negative value $i$, and up to that point the output in graph D is a positive value as is the switching signal. However, at the negative value $i$ the switching signal is I which corresponds to the drop-out point P of curve 30, and the switch operating apparatus 20 "drops out" to simultaneously operate the switches 16, 18 and 26 into their second or alternative attitudes, thus simultaneously reversing the control signal as seen by amplifier 12 and the output of the amplifier 12 as seen by the load. The latter, of course, reverses the switching signal. Also at the same time the control characteristic of the switch operating apparatus 20 is shifted from 30 to 32 by a positive change of bias effected by switch 26, thus making the pickup and drop-out points of apparatus 20 responsive to negative values of switching signal.

The reversal of the control signal by switch 16 is shown in the jump from $i$ to $j$ in graph B in which graph $j$ is, because of the reversal, a positive value as seen by the amplifier 12. Although of opposite polarity in graph B, $i$ and $j$ are of the same unit value which value for the different polarities produces different output values of the amplifier 12. This is shown in graph C where the output values I and J result respectively from control signal values $i$ and $j$. However, the output of amplifier 12 also having been reversed the value J supplied to the load and apparatus 20 is of negative polarity, I having been of positive polarity (graphs D and E). Considering that at this time the apparatus 20 has released or dropped out, the bias state should be such that the pickup point Q should be responsive to a less negative value of switching signal than the value J to prevent a pickup with the value J.

Continuing to increase in the negative direction the control signal passes through values $k$ and $m$ resulting respectively in output values K and M and corresponding switching signal values K and M.

Now suppose the control signal at its source begins to recede from a high negative value. As the negative signal decreases and passes through values $m$, $k$, and $j$, the corresponding output values will be M, K and J which as seen by the load 10 are negative. As the control signal approaches $n$ it turns positive, the output of amplifier 12 and as seen by the load 10 and apparatus 20 still being negative. However, when the control signal reaches value $n$, the corresponding output and switching value N being the pickup point Q of the apparatus 20, the apparatus 20 picks up and simultaneously operates the switches 16, 18 and 26 to reverse the control signal as seen by amplifier 12, reverse the output of amplifier 12 as seen by the load 10 and apparatus 20, and to change the bias on apparatus 20 in a negative direction to shift the control characteristic of apparatus 20 to the position 30.

This reversal results in a jump from negative output value N to positive output value H. Again the bias state should be such that the value H is greater than the switching signal value corresponding to drop-out signal point P.

It will be appreciated that the switching area defined by H, I, J and N in graph D may be and preferably is only a small part of the total control characteristic. The dashed line in the block diagram of Fig. 1 represents a switch operating linkage.

Fig. 2 is a circuit diagram of one example of a specific apparatus that fits within the block diagram of Fig. 1, and corresponding components bear the same reference numerals.

The reversible control signal source 14 is shown as including a battery 36 and a center-tapped potentiometer 38 to provide reversibility. The control signal source is connected through a reversing switch 16 contained in the dashed enclosure so numbered, to the control winding 40 of a single-ended magnetic amplifier 12 which includes the self-saturating doubler circuit 42 and a bridge rectifier 44 in its output to supply direct current to the load 10 through a reversing switch 18 contained in the dashed enclosure so numbered.

The self-saturating doubler magnetic amplifier 12 includes a saturable reactor 46 with a magnetizable core 48 carrying a pair of load windings 50 and 52 each connected in series with one-way valves indicated at 54 and 56 respectively. Load winding 50 and its associated valve 54 is in parallel with load winding 52 and valve 56 between an alternating current supply source 58 and the rectifier 44, the valves 54 and 56 being reversely related to supply alternating current to rectifier 44. Bias, if necessary to position the control characteristic, may be provided by a bias winding 60 supplied from a source of bias current 62. The control characteristic as hereinbefore described must cross the zero line of the input, i. e., the output must have a range extending from a minimum to a maximum in response to input values extending through both polarities. Such a characteristic is shown in graph C. Since, without auxiliary aid, the direct current output of the amplifier 12 out of the rectifier 44 is not reversible, the amplifier is a single-ended amplifier.

The output of amplifier 12, as seen by the load 10 through the reversing switch 18 is also connected to the control winding 64 of a switching amplifier 24 whose output is connected to a solenoid actuator 22. Amplifier 24 and actuator 22 together form the switch operating apparatus 20.

Amplifier 24 is a bridge type self-saturating magnetic amplifier and includes a magnetizable core 66 carrying a pair of load windings 68 and 70, a switch-in bias winding 72, and the control winding 64. If inherent design does not give the desired initial characteristics, then a permanent bias may be supplied for that purpose through a winding 74. The load windings 68 and 70 together with one-way valves 76, 78, 80 and 82, are connected in a full-wave bridge form with conjugate terminals at 84, 86, 88 and 90. Conjugate terminals 84 and 86 are connected to an alternating current supply source 92, while conjugate points 88 and 90 constitute the output of the bridge and amplifier 24 and are connected to the energizing winding of the actuator 22. Bias winding 72 is connected in a circuit including a bias switch 26 and a switch-in bias source 28, for example the battery shown.

Actuator 22 is provided with a solenoid plunger 92 connected to a switch-operating rod 94, normally biased downward in the drop-out position by a spring 96. The drop-out direction is indicated by an arrow so labeled. When the solenoid coil of actuator 22 is energized to the pickup value the plunger 94 and rod 92 are drawn upward as indicated by the pickup arrow. Rod 94 is connected to and actuates simultaneously all the contact bars of the respective switches, to place them in one attitude on pickup and in their second attitude upon drop-out.

The actuator 22 is shown in the pickup or energized position. In this position the respective switches are in the following attitudes. Bias switch 26 is closed. Switch 16 connects the conductors from the signal source 14 to the control coil 40 in such manner that conductor 100 from the signal source is connected to conductor 102 to the coil 40, and conductors 104 and 106 of the signal source 14 and the coil 40 respectively are connected together. Switch 18 connects the output of amplifier 12 at rectifier 44 to the load 10 and as a switching signal to the control coil 64 of the switching amplifier 24. The switch connection is such that the positive terminal 108 of rectifier 44 is connected to conductor 110 leading to the load and to the control coil 64, while the negative terminal 112 of rectifier 44 is connected to conductor 114.

With the switches 16, 18 and 26 in the attitudes described in the last paragraph in response to the pickup position of the actuator, and if it be assumed that the control signal is at some positive value between zero and $f$ (graphs A, B, C and D), the electrical output of amplifier 12, as seen by the load 10 and as a switching signal by the control coil 64, will be at the corresponding positive value between zero and F (graphs D and E), and negative bias from the source 28 is applied through switch 26 and bias winding 72 to the switching amplifier 24 to shift the characteristic of the amplifier 24 to position 30 in graph E to make the operational points P and Q responsive to positive switching signals.

If the arm of potentiometer 38 is adjusted to pass the control signal through zero and into negative values the electrical output of amplifier 12 on the load side of switch 18 will decrease until the switching signal falls to the drop-out value I (graph E) at which point the output electricity of the switching amplifier 24 is at the drop-out value of the actuator 22 which drops out to actuate the switches 16, 18 and 26 into their other attitude thereby to reverse the circuits interconnected through switches 16 and 18 and to change the bias on the switching amplifier in the positive direction by opening switch 26 and removing the negative bias. The bias change shifts the characteristic of amplifier 24 to position 32 (graph E) in which position the operational points P and Q are responsive to negative switching signal values.

Reversal of the circuits by switches 16 and 18 results in connection between conductors 100 and 106, between conductors 102 and 104, between rectifier terminal 108 and conductor 114, and between rectifier terminal 112 and conductor 110. As a result of the reversal by the switches the electrical output and switching signal jump to the negative value J (graphs D and E).

Continued increase in the negative control signal increases the negative output and switching signal values as seen in the graphs. If the control signal is decreased in negative value and changes to positive value the amplifier output on the load side of switch 18 will decrease in negative values until the control signal reaches the positive value $n$ at which time the output and switching signal will be at N which corresponds to the pickup point Q for curve 32. At this point the output of amplifier 24 energizes actuator 22 to its pickup position, to again reverse the input and output of amplifier 12 and to add the switch-in negative bias from the bias source 28 to amplifier 24.

Thus, it can be seen that the operation of the specific embodiment in Fig. 2 falls within the broad operational requirements as set out in connection with the block diagram of Fig. 1.

Load 10 may be any device which may require a reversible polarity power supply, for example, a reversible direct current motor.

It should be pointed out that the invention can be practiced by reversing the switching coil (64) terminals so that the polarities of the switching signal and of the output as seen by the load 10 are opposed. Thus when positive output goes down the actuator 22 picks up and as the negative goes down the actuator 22 drops out. In all cases it appears that the pickup has to effect a negative bias change to amplifier 24, i. e., either add negative bias or remove positive bias if such had been previously provided.

The matter of adding or subtracting either negative or positive bias to place or shift the control characteristic of an amplifier is well known in the art and no further explanation is deemed necessary. The same applies to the design of amplifiers of various types to fit a particular purpose. Operation and design of magnetic amplifiers per se are well known and no further or detailed explanation thereof is deemed necessary.

It may be noted that for the particular switch position or attitude shown in Fig. 2, and with the control signal at some positive value above $h$ (graph A), the direction of the magneto-motive forces supplied by the various reactor windings of both amplifiers is indicated by the directional arrows under the winding.

It is further understood that amplifiers may be responsive to input or control signals which may be classified as voltages, currents, power, or other, and that the output of amplifiers may be considered in volts, amperes, power, or other. Specific mention of these forms or "dimensions" of electricity have been avoided since the invention may be practiced with signals and outputs which may be termed in volts, amperes, power, or other "dimensions" of electricity.

As hereinbefore stated, the curves in the graphs are idealized and linear to keep them general for explanatory purposes. They are applicable to all types of amplifiers even though their control characteristics are not linear as shown in the graphs. The intersection point of the axes in each graph is the zero value for both axes.

While the form of embodiment of the invention as herein disclosed constitutes a preferred form, it is to be understood that other forms might be adopted, all coming within the scope of the claims which follow.

What is claimed is as follows:

1. An electrical system having a reversible output in response to a reversible control signal, said system comprising a source of reversible control signals, a load, a single-ended amplifier having a control input circuit coupled to said source and an output circuit coupled to said load, and means responsive to the output supplied by said output circuit to the load for simultaneously reversing the respective polarities of the control signal and of said output, said means comprising reversing switch means interposed between said source and said amplifier and between said amplifier and said load, and switch operating means for actuating said switch means, said switch operating means having operational points responsive to a switching signal, means for supplying to the switch operating means a switching signal responsive to said output as it appears on the load side of the switch means between the amplifier and the load, and means responsive to said output for shifting the polarity sensitivity of said operational points.

2. An electrical system having a reversible output in response to a reversible control signal, said system comprising a source of reversible control signals, a load, a single-ended amplifier having a control input circuit coupled to said source and an output circuit coupled to said load, and means responsive to the output supplied by said output circuit to the load for simultaneously reversing the respective polarities of the control signal and of said output, said means comprising reversing switch means interposed between said source and said amplifier and between said amplifier and said load, and switch operating means for actuating said switch means, said switch operating means having operational points responsive to a switching signal, means for supplying to the switch operating means a switching signal responsive to said output as it appears on the load side of the switch means between the amplifier and the load, and means responsive to said switching signal for shifting the polarity sensitivity of said operational points.

3. An electrical system having a reversible output in response to a reversible control signal, said system comprising a source of reversible control signals, a load, a single-ended amplifier having a control input circuit coupled to said source and an output circuit coupled to said load, and means responsive to the output supplied by said output circuit to the load for simultaneously reversing the respective polarities of the control signal and of said output, said means comprising reversing switch means interposed between said source and said amplifier and between said amplifier and said load, and switch operating means for actuating said switch means, said switch operating means having operational points responsive to a switching signal, means for supplying to the switch operating means a switching signal responsive to said output as it appears on the load side of the switch means between the amplifier and the load, and means responsive to said switching signal for shifting the polarity sensitivity of said operational points, the latter means including bias changing means responsive to operation of the switch operating means for changing the bias state of the switch operating means.

4. An electrical system having a reversible output in response to a reversible control signal, said system comprising a source of reversible control signals, a load, a single-ended amplifier having a control input circuit coupled to said source and an output circuit coupled to said load, and means responsive to the output supplied by said output circuit to the load for simultaneously reversing the respective polarities of the control signal and of said output, said means comprising reversing switch means interposed between said source and said amplifier and between said amplifier and said load, and switch operating means for actuating said switch means, said switch operating means having operational points responsive to a switching signal, means for supplying to the switch operating means a switching signal responsive to said output as it appears on the load side of the switch means between the amplifier and the load, and bias changing means responsive to said switching signal for shifting the polarity sensitivity of said operational points.

5. An electrical system having a reversible output in response to a reversible control signal, said system comprising a source of reversible control signals, a load, a single-ended amplifier having a control input circuit coupled to said source and an output circuit coupled to said load, and means responsive to the output supplied by said output circuit to the load for simultaneously reversing the respective polarities of the control signal and of said output, said means comprising reversing switch means interposed between said source and said amplifier and between said amplifier and said load, and switch operating means for actuating said switch means, said switch operating means having operational points responsive to a switching signal, means for supplying to the switch operating means a switching signal responsive to said output as it appears on the load side of the switch means between the amplifier and the load, and bias changing means responsive to said switching signal for shifting the polarity sensitivity of said operational points by making a bias change of the same polarity as the polarity of the switching signal effecting the change.

6. In an electrical system in which a single-ended amplifier has a signal input circuit coupled to a source of reversible signals and also has an output circuit coupled to a load to supply, and wherein switch means are interposed between the signal source and the amplifier input and between the amplifier output circuit and the load for reversing the respective polarities of the control signal and of the amplifier output in response to the actuation of the switch means, the combination therewith of switch operating means for actuating the switch means in response to said output as it appears at the load side of said switch means, said switch operating means having a control characteristic including operational points responsive to a switching signal, means for supplying to the switch operating means a switching signal responsive to said output as it appears at the load side of said switch means, and means responsive to the switch operating means for changing the polarity sensitivity of said operational points whenever the polarity of said output as it appears at the load side of said switch means is reversed.

7. In an electrical system in which a single-ended amplifier has a signal input circuit coupled to a source of reversible signals and also has an output circuit coupled to a load to supply, and wherein switch means are interposed between the signal source and the amplifier input and between the amplifier output and the load for reversing the respective polarities of the control signal and of the amplifier output in response to the actuation of the switch means, the combination therewith of switch operating means for actuating the switch means in response to said output, said switch operating means being adapted to pickup and drop out at respectively different values of a particular polarity, and means responsive to said output for causing the switch operating means to pickup and drop out at different values of the polarity opposite to said particular polarity when the polarity of said output is reversed.

8. An electrical system comprising a single-ended amplifier having an input circuit for receiving a control signal and an output circuit for supplying a load, an input reversing switch in said input circuit for reversing the control signal applied to the amplifier, an output reversing switch in said output circuit for reversing the output of the output circuit, said output reversing switch having one side connected to the amplifier output and the other side connectable to the load and referred to as the load side of the switch, and a switch operating apparatus for simultaneously actuating said switches in response to an electrical condition on the load side of the output reversing switch, said apparatus including means for obtaining a switching signal from the load side of the output reversing switch, said apparatus being operable to pickup and drop out in response to said switching signals, said apparatus including means for reversing the polarity sensitivity of the pickup and drop-out points whenever a pickup or drop out occurs.

9. An electrical system comprising a single-ended amplifier having an input circuit for receiving a control signal and an output circuit for supplying a load, an input reversing switch in said input circuit for reversing the control signal applied to the amplifier, an output reversing switch in said output circuit for reversing the output of the output circuit, said output reversing switch having one side connected to the amplifier output and the other side connectable to the load and referred to as the load side of the switch, and a switch operating apparatus for simultaneously actuating said switches in response to an electrical condition on the load side of the output reversing switch, said apparatus including means for obtaining a switching signal from the load side of the output reversing switch, said apparatus being operable to pickup and drop out in response to said switching signals, said apparatus including means for reversing the polarity sensitivity of the pickup and drop-out points whenever a pickup or drop out occurs, the latter means comprising bias changing means responsive to said switching signal for effecting a bias change whenever the switching signal is reversed.

10. An electrical system comprising a single-ended amplifier having an input circuit for receiving a control signal and an output circuit for supplying a load, an input reversing switch in said input circuit for reversing the control signal applied to the amplifier, an output reversing switch in said output circuit for reversing the output of the output circuit, said output reversing switch having one side connected to the amplifier output and the other side connectable to the load and referred to as the load side of the switch, and a switch operating apparatus for simultaneously actuating said switches in response to an electrical condition on the load side of the reversing switch, said apparatus including means for obtaining a switching signal from the load side of the output reversing switch, said apparatus being operable to pickup and drop out in response to said switching signals, said apparatus including means for changing the bias state of said apparatus in response to a switching signal of one polarity to effect a bias change of like polarity.

11. An electrical system having a reversible output in response to a reversible control signal, said system comprising a source of reversible control signals, a load, a magnetic amplifier having a control input circuit coupled to said source and an output circuit coupled to said load, and means responsive to the output supplied by said output circuit to the load for simultaneously reversing the respective polarities of the control signal and of said output, said means comprising reversing switch means interposed between said source and said amplifier and between said amplifier and said load, and switch operating means for actuating said switch means, said switch operating means having operational points responsive to a switching signal, means for supplying to the switch operating means a switching signal responsive to said output as it appears on the load side of the switch means between the amplifier and the load, and means responsive to said output for shifting the polarity sensitivity of said operational points.

12. An electrical system having a reversible output in response to a reversible control signal, said system comprising a source of reversible control signals, a load, a magnetic amplifier having a control input circuit coupled to said source and an output circuit coupled to said load, and means responsive to the output supplied by said output circuit to the load for simultaneously reversing the respective polarities of the control signal and of said output, said means comprising reversing switch means interposed between said source and said amplifier and between said amplifier and said load, and switch operating means including magnetic amplifier means for actuating said switch means, said switch operating means having operational points responsive to a switching signal, means for supplying to the switch operating means a switching signal responsive to said output as it appears on the load side of the switch means between the amplifier and the load, and bias changing means responsive to said switching signal for shifting the polarity sensitivity of said operational points.

13. An electrical system comprising a magnetic amplifier having an input circuit for receiving a control signal and an output circuit for supplying a load, an input reversing switch in said input circuit for reversing the control signal applied to the amplifier, an output reversing switch in said output circuit for reversing the output of the output circuit, said output reversing switch having one side connected to the amplifier output and the other side connectable to the load and referred to as the load side of the switch, and a switch operating apparatus for simultaneously actuating said switches in response to the output at the load side of the reversing switch, said apparatus including means for obtaining a switching signal from the load side of the output reversing switch, said apparatus being operable to pickup and drop out in response to said switching signals, said apparatus including means for reversing the polarity sensitivity of the pickup and drop-out points whenever a pickup or drop out occurs.

14. An electrical system comprising a magnetic amplifier having an input circuit for receiving a control signal and an output circuit for supplying a load, an input reversing switch in said input circuit for reversing the control signal applied to the amplifier, an output reversing switch in said output circuit for reversing the output of the output circuit, said output reversing switch having one side connected to the amplifier output and the other side connectable to the load and referred to as the load side of the switch, and a switch operating apparatus including magnetic amplifier means for simultaneously actuating said switches in response to output at the load side of the reversing switch, said apparatus including means for obtaining a switching signal from the load side of the output reversing switch, said apparatus being operable to pickup and drop out in response to said switching signals, said apparatus including means for reversing the polarity sensitivity of the pickup and drop-out points whenever a pickup or drop out occurs, the latter means comprising bias changing means responsive to said switching signal for effecting a bias change whenever the switching signal is reversed.

References Cited in the file of this patent

UNITED STATES PATENTS

| | | |
|---|---|---|
| 2,264,333 | Satterlee | Dec. 2, 1941 |
| 2,459,177 | Moseley et al. | Jan. 18, 1949 |

FOREIGN PATENTS

| | | |
|---|---|---|
| 950,201 | France | Sept. 21, 1949 |